United States Patent

[11] 3,613,935

| [72] | Inventor | Bernard Rogge<br>Baldwin, Md. |
|------|----------|---------|
| [21] | Appl. No. | 627,253 |
| [22] | Filed | Mar. 28, 1967 |
| [45] | Patented | Oct. 19, 1971 |
| [73] | Assignee | The United States of America as represented by the Secretary of the Army |

[54] CLOSURE AND METHOD OF MAKING THE SAME
15 Claims, 6 Drawing Figs.

| [52] | U.S. Cl. | 220/24 A |
|------|----------|----------|
| [51] | Int. Cl. | B65d 39/00 |
| [50] | Field of Search | 220/24, 24 A, 46 MS |

[56] References Cited
UNITED STATES PATENTS

| 3,387,735 | 6/1968 | DeMarco | 220/24 |

*Primary Examiner*—James B. Marbert
*Attorneys*—Harry M. Saragovitz, Edward J. Kelly, Herbert Berl and Jacob Ziegler ABSTRACT: A seal for receptacles having generally a cylindrical opening closed by an unthreaded plug requiring no packing or compressible material to prevent leakage. The seal is accomplished by the sheared metal formed in an internal undercut of the plug of highly compressed metal and the contiguous surfaces of the sealing plug and wall of the cylindrical opening.

PATENTED OCT 19 1971 3,613,935
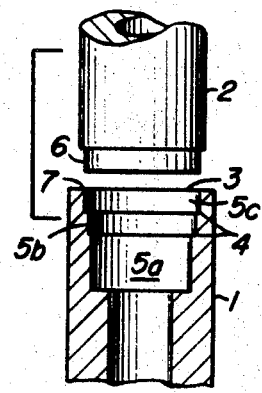
Fig. 1
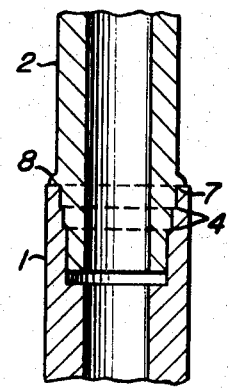
Fig. 2
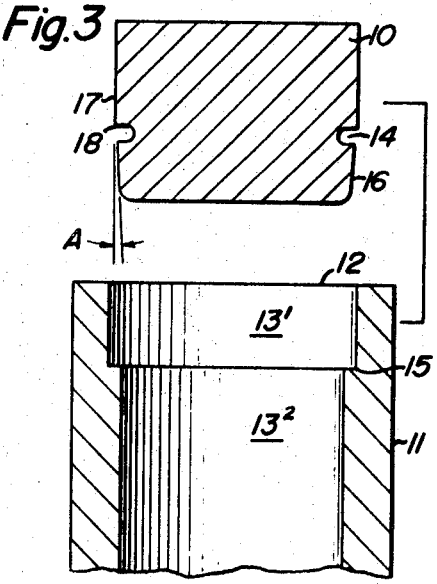
Fig. 3
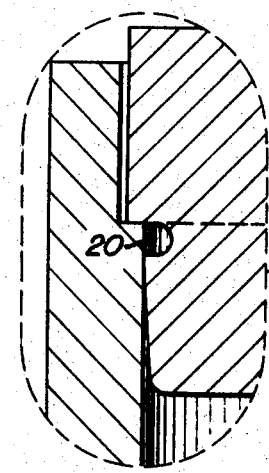
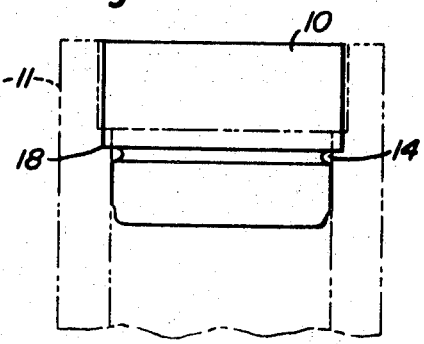
Fig. 4
Fig. 5
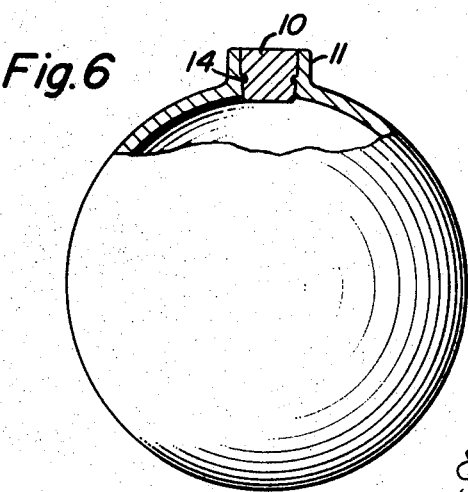
Fig. 6
INVENTOR.
Bernhard Rogge
BY Harry M. Saragovitz,
Edward J. Kelly, Herbert Berl
& Jacob Ziegler
ATTORNEYS

CLOSURE AND METHOD OF MAKING THE SAME

This invention relates to an unthreaded sealing plug which cuts its own path upon entering the cavity and thereby does not require any packing agent to give adequate sealing properties.

An important object of the present invention is to provide an improved, simple and inexpensive closure system which is a substitute for welded, soldered or mechanical sealing elements. A related object resides in the provision of an improved combined seal and closure system construction particularly adapted to be utilized in sealing solid particles, gases, and fluids in vessels withstanding high temperatures and/or pressures.

It is a further object of the invention to provide the plug when so engaged that there is no need for the conventional gasket to form the seal between the joined surfaces.

In the past closure systems have presented many problems, the dominant feature which must be met by every closure is its resistance to leakage arising after the joint is subjected to the desired pressure and temperature. Leakage of fluid or gases through invisible openings in the joint usually is overcome by the utilization of packing material, for example, compressible substances such as rubber, soft metal and/or a plurality of tighting bolts which force the plug into the packing material and then finally into its seat. The one disadvantage of this latter system is the added expense in fabrication in view that the bolts require a machining operation for a screw thread with the required corresponding threading and aligning with lugs on the vessel.

My invention for the novel closure system overcomes all the disadvantages of the prior art for the reasons which become clear from the following discussion.

According to the instant invention, there is no requirement for any packing or gasket material in order to make a better seal and, in addition, there is no need for any machining operations for preparing screw threads. My closure system is accomplished by the simple insertion of the plug into the receiving cavity.

The added advantage of my invention is that no heat, distortion or change of metallurgical structure occurs during the sealing operation as distinguished from welding procedure.

Another feature of this invention is that the tolerances and cleanliness of the surface members are not critical as in the requirement of the prior art when a press-fit or welding procedure is employed. As is well recognized in the art in the utilization of the press-fit for sealing, the surfaces of the joining members must be held within critical tolerances both to dimensions and shaping. In the welding method, carbon deposits as residue on the surfaces interfere with preparing a satisfactory closure. For the first time, my discovery produces a seal and closure system which patently overcomes the disadvantages inherent in the former seals. Utilizing aluminum stock, the shearing action removed the aluminum oxide on the internal surface and thereby creates a metallic clean surface thus encouraging a cold weld action.

The cylindrical opening 12 and sealing element 10 preferably are both constructed of some suitable hard, strong, and rigid material such as metal or the metal of the cylindrical opening being slightly softer than the sealing element for a purpose to become apparent as the description proceeds. The metal may be steel, aluminum or any other suitable material which is fabricated into sealing elements.

Further objects and advantages of the invention will be in part obvious and in part pointed out hereinafter.

FIG. 1 is a longitudinal section of the sealing element just prior to be positioned in the opening of the prior art.

FIG. 2 is a view corresponding to FIG. 1 and showing the sealing element in its final position in the opening. Similar reference numerals are used to designate similar parts.

FIG. 3 is a longitudinal section of the sealing element prior to be positioned in the opening of the invention.

FIG. 4 is a view correspond to FIG. 3 showing the sealing element mounted within the opening and just prior to be positioned into final position.

FIG. 5 is a view corresponding to FIG. 4 and showing the sealing element in its final position in the cylindrical opening. Similar reference numerals have again been used to designate similar parts.

FIG. 6 is one specific use of the closure system with bomblets.

In FIGS. 1 and 2, stocks 1 and 2 are of metal with the hardness of stock 1 being harder than stock 2, and cavity 3 decreasing in cross-sectional area in a stepwise manner that is three counterbores represented by the concentric cylindrical sections 5a, 5b, and 5c. In forming the joint, portion 6 is inserted into cavity 3, and force is applied with the shearing of the metal of portion 6 by the sharp protecting steps 4 and the cavity edge 7, and thereby the sheared metal is externally, turned or rolled back as shown by 8 in FIG. 2.

In FIGS. 3 to 6, the seal of my invention comprises a receptacle 11 having a general cylindrical opening 12, closed by a plug 10. Opening 12 has two concentric cylindrical sections $13^1$ and $13^2$ with the sharp projecting step 15 representing an abrupt decrease in the size of the opening. Plug 10 has a vertical straight upper portion 17 and then an inclining or tapering lower portion 16 starting from the undercut 14 downwardly to the bottom of the plug, whereby a small angle A is defined between the said upper portion and the said bottom of the tapered portion, as shown in FIG. 3. The cutting or shearing edge 18 is formed by the creation of the undercut at the junction of the vertical straight upper portion and the tapering lower portion of plug 10. By way of example, the angle A may be approximately 5° to 6°. The inner vertical diameter of $13^1$ may be from about 0.434 to about 0.444 inch being slightly larger than the outer diameter of the vertical straight upper portion of plug 10 which may be from about 0.431 to about 0.441 inch; there is sufficient vertical clearance to allow the entrance of the upper portion of plug 10 without any binding effect in portion $13^1$. The start of the undercut, groove, or indentation 14 is placed downwardly from the top of 10 approximately two-thirds of the entire length of 10. The shape of the undercut is approximately circular in configuration and is approximately 0.020 to 0.030 inch in diameter. The inner diameter of the wall of section $13^2$ may be from 0.425 to about 0.435 inch being slightly larger than the circumferential diameter of the taper at the undercut of the plug 10. The vertical inner wall of $13^2$ is marked as 20 in the fragmentary enlargement of FIG. 4.

In forming the joint, plug 10 is inserted into section $13^1$ where the bottom of 10 first encounters the sharp projecting step 15, and plug 10 is not prevented in its downward movement. The diameter of the taper at the end of 10 is slightly smaller than the inner diameter of $13^2$. The dimensions of the tapered portion of 10 and $13^2$ are sufficient that there is no natural slippage for such interfaces. For example, the inner diameter of $13^2$ may be from about 0.413 to about 0.423 inch in outer diameter. Downward movement of plug 10 is continued until the cutting edge 18 encounters the projecting step or lip 15 and its unhindered movement is stopped, as shown in FIG. 4. Pressure to 10 now is applied whereupon the cutting edge 18 performs the first act to shear the inner diameter of $13^2$ making its own path as it continues its downward movement. The sheared metal is forced into the groove 14, and the circumferential outer wall of the plug 10 is contiguous with the inner wall of $13^2$. The diameter of the sheared inner wall of $13^2$ is larger than the diameter of the unsheared said inner wall. For example, the initial unsheared inner wall diameter may be from about 0.425 to about 0.435 inch, while the dimensions of the sheared wall may be from about 0.431 to about 0.441 inch. Plug 10 is frictionally self-locked in the opening by the filled groove with sheared metal and with the radially expanded sheared inner wall of $13^2$. The undercut is filled with sheared metal at about one-third the travel of the plug into the cylindrical opening.

The seal of my invention has many advantages. It requires no operation other than lowering the sealing element into the cylindrical opening similar to a punch and die-stamping method. Exact spotting, dimensions or alignment of the sealing element is not critical.

The application of my seal has unlimited utilization in containers with various fills where the sealing requirement is sophisticated. The container can be any hollow vessel or in the form of projectiles such as bombs, rockets, and missiles. The fill can be a composition of a military nature such as explosives, white phosphorus, and incapacitating agents.

The standard test for determining proper sealing is the helium leak testing procedure. The closure or joint shall not permit helium to pass at a rate greater than $1.0 \times 10^{16}$ atmospheric cubic centimeters per second. Utilizing the welding or press-fit closure, the number of rejects by failing the meet the criterion of the helium procedure exceeded the requirement for commercial production. The effectiveness of my closure goes beyond the limits set by the above helium standard and requirements for commercial production by not permitting the passage of helium at $1.0 \times 10^{17}$ atmospheric cubic centimeters per second.

Although I have disclosed herein the preferred embodiment of my invention, I intend to cover as well any change or modification therein which may be made without departing from the spirit and scope of the invention.

I claim:

1. A seal for a vessel comprising: a receptacle having a general cylindrical opening closed by an unthreaded plug with a tapered head fitting within the cylindrical opening, said plug at the point of tapering having a circumferential step undercut which is filled with highly compressed metal sheared from the cylindrical wall opening forming an internal seal, said wall of the sheared cylindrical opening being contiguous with the external diameter of the unthreaded plug.

2. The structure of claim 1, wherein the composition of the cylindrical opening and plug are of substantially the same hardness.

3. The structure of claim 1, wherein the composition of the cylindrical opening is relatively softer than the plug.

4. The structure of claim 1, wherein the taper is about 5° to 6° in the plug.

5. The method of joining two surfaces in a receptacle having a general cylindrical opening closed by an unthreaded plug with tapered and comprising: introducing the said plug into the cylindrical opening, said plug at the point of tapering having a circumferential step undercut forming a sharp cutting edge, said cylindrical opening being slightly larger than the diameter of the cutting edge formed by the undercut, applying force to the plug the said cutting edge shears the wall of cylindrical opening as the plug forces its own path down the wall of the said opening, and closing the cylindrical opening with an internal seal of sheared metal filling the said circumferential step undercut, whereby the wall of the cylindrical opening is made contiguous with the external diameter of the said plug.

6. The method of claim 5, wherein the circumferential step undercut is filled with highly compressed metal approximately one-third the travel of the plug.

7. In claim 5, the taper is 5° to 6° in the plug.

8. A sealed munition comprising a shaped hollow container containing a munition filler with the seal as defined in claim 1.

9. The munition of claim 8, wherein the shaped hollow container is a bomb, rocket, or missile.

10. The munition of claim 9, wherein the filler is an explosive, white phosphorus, or incapacitating agent.

11. An insert adapted to be secured in tight-fitting relation in an opening in a metal wall and comprising a rigid body having a guide portion and a broach portion spaced endwise of the body from the guide portion, the broach portion having an annular cutting edge with is continuous peripherally and faces endwise of the body toward the guide portion, the peripheral outlines of the cutting edge and of the guide portion, respectively, when projected on a plane normal to the axis of the cutting edge, being so related that the outline of the guide portion is disposed wholly within and spaced inwardly from the outline of the cutting edge, the spacing of the cutting edge outwardly from the guide portion being relatively small so that the cutting edge can broach off and convert to chips a radially thin stratum of the metal defining the original wall opening into which the guide portion can fit in guiding relation, and thereby broach the opening to a precise shape and size, and said body having a peripherally continuous groove adjacent the cutting edge and opening radially outwardly and operative to receive and accommodate the chips formed by the cutting edge as they are cut loose from the wall of the opening by pressing the body, guide The structure according foremost, into the wall opening.

12. The structure according to claim 11 wherein the broach portion has a peripheral wall extending from the cutting edge in a direction away from the guide portion for a substantial distance endwise of the body, and said peripheral wall being of substantially uniform cross section throughout its length endwise of the body and of substantially the same cross section as the outer periphery of the cutting edge and at least as large in outline as said cutting edge.

13. The structure according to claim 11 wherein the cutting edge is circular, the outer peripheral wall of the broach portion is cylindrical and coaxial with the cutting edge and is at least as large in diameter as the cutting edge, the cutting edge is of slightly larger diameter than the maximum diameter of the guide portion, the said groove is circular in section in planes normal to the axis of the body, and is of less diameter than the cutting edge and has an inner diameter less than the outer diameter of the guide portion.

14. The structure according to claim 11 wherein the body has a solid imperforate plug.

15. The process for producing a combination of a metal plate having an opening therein and providing an insert to be secured in the opening, and comprising forming a body having a guide portion receivable in and fitting in guiding relation in, the opening, and said insert having a cutting edge facing toward said guide portion and of a shape corresponding to the shape of the opening and very slightly larger in outline than said opening, and having a peripheral wall extending from the cutting edge in a direction away from the guide portion for a substantial distance and coextensive peripherally with, and, of substantially the same shape as, and at least as large in outline as, the cutting edge; pressing the insert, guide portion foremost, into the opening and thereby broaching off and forming into chips a thin stratum of the metal defining the original opening and thereby concurrently broaching an enlarged opening very slightly larger than the old opening, removing the chips so formed from the newly formed wall surface defining the enlarged opening and concurrently press-fitting the peripheral wall of the body into binding contact with the wall of the enlarged opening.